United States Patent [19]
Day et al.

[11] Patent Number: 6,084,767
[45] Date of Patent: Jul. 4, 2000

[54] ULTRACAPACITOR SEPARATOR

[75] Inventors: James Day, Scotia; Chang Wei, Niskayuna, both of N.Y.

[73] Assignee: General Electric Company, Schenectady, N.Y.

[21] Appl. No.: 09/162,530

[22] Filed: Sep. 29, 1998

[51] Int. Cl.$^7$ ............................ H01G 9/02; H01G 9/00
[52] U.S. Cl. ........................ 361/512; 361/525; 427/79
[58] Field of Search ............................ 361/502, 504, 361/511, 512, 517–519, 530, 525, 535–537; 29/25.03; 427/79

[56] References Cited

U.S. PATENT DOCUMENTS

| | | | |
|---|---|---|---|
| 4,605,989 | 8/1986 | Marse et al. | 361/502 |
| 4,803,597 | 2/1989 | Watanabe et al. | 361/502 |
| 5,136,472 | 8/1992 | Tsuchiya et al. | 361/502 |
| 5,150,283 | 9/1992 | Yoshida et al. | 361/502 |
| 5,420,747 | 5/1995 | Ivanov et al. | 361/502 |
| 5,439,762 | 8/1995 | May et al. | 429/218 |
| 5,464,453 | 11/1995 | Tong et al. | 29/25.03 |
| 5,472,493 | 12/1995 | Regan | 600/372 |
| 5,723,231 | 3/1998 | Wu et al. | 429/203 |
| 5,726,856 | 3/1998 | King, Jr. et al. | 361/505 |

FOREIGN PATENT DOCUMENTS 11486   4/1996   WIPO .

OTHER PUBLICATIONS

"Mobility and Ionic Association of Lithium Salts in a Propylene Carbonate–Ethyl Methyl Carbonate Mixed Solvent", Ue & Mori, Electrochem. Soc., vol. 142, No. 8, Aug. 1995.

"Adsorption of Gases in Multimolecular Layers", Brunauer, Emmett & Teller, J. Am. Chemical Society, vol. 60, pp. 309–319 (1938).

*Primary Examiner*—Kristine Kincaid
*Assistant Examiner*—Anthony Dinkins
*Attorney, Agent, or Firm*—Noreen C. Johnson; Douglas E. Stoner

[57] ABSTRACT

An ultracapacitor includes two solid, nonporous current collectors, two porous electrodes separating the collectors, a porous separator between the electrodes and an electrolyte occupying the pores in the electrodes and separator. The porous separator layer comprises an amorphous fumed silica layer coated onto at least one of the electrodes.

12 Claims, 4 Drawing Sheets

ULTRACAPACITOR SEPARATOR

This invention was made with government support under Contract No. 38-83CH10093 awarded by DOE. The government may have certain rights in the invention.

BACKGROUND OF THE INVENTION

Capacitors are storage devices that store electrical energy on an electrode surface. Electrochemical cells create an electrical charge at electrodes by chemical reaction. The ability to store or create electrical charge is a function of electrode surface area in both applications. Ultracapacitors, sometimes referred to as double layer capacitors, are a third type of storage device. An ultracapacitor creates and stores energy by microscopic charge separation at an electrical chemical interface between electrode and electrolyte.

Ultracapacitors are able to store more energy per weight than traditional capacitors and they typically deliver the energy at a higher power rating than many rechargeable batteries. Ultracapacitors comprise two porous electrodes that are isolated from electrical contact by a porous separator. The separator and the electrodes are impregnated with an electrolytic solution, which allows ionic current to flow between the electrodes while preventing electronic current from discharging the cell. Each electrode is in intimate contact with a current collector. One purpose of the current collector is to reduce ohmic loss. If the current collectors are nonporous, they can also be used as part of the capacitor case and seal.

When electric potential is applied to an ultracapacitor cell, ionic current flows due to the attraction of anions to the positive electrode and cations to the negative electrode. Upon reaching the electrode surface, the ionic charge accumulates to create a layer at the solid liquid interface region. This is accomplished by absorption of the charge species themselves and by realignment of dipoles of the solvent molecule. The absorbed charge is held in this region by opposite charges in the solid electrode to generate an electrode potential. This potential increases in a generally linear fashion with the quantity of charge species or ions stored on the electrode surfaces. During discharge, the electrode potential or voltage that exists across the ultracapacitor electrodes causes ionic current to flow as anions are discharged from the surface of the positive electrode and cations are discharged from the surface of the negative electrode while an electronic current flows through an external circuit between electrode current collectors.

In summary, the ultracapacitor stores energy by separation of positive and negative charges at the interface between electrode and electrolyte. An electrical double layer at this location consists of sorbed ions on the electrode as well as solvated ions. Proximity between the electrodes and solvated ions is limited by a separation sheath to create positive and negative charges separated by a distance which produces a true capacitance in the electrical sense.

During use, an ultracapacitor cell is discharged by connecting the electrical connectors to an electrical device such as a portable radio, an electric motor, light emitting diode or other electrical device. The ultracapacitor is not a primary cell but can be recharged. The process of charging and discharging may be repeated over and over. For example, after discharging an ultracapacitor by powering an electrical device, the ultracapacitor can be recharged by supplying potential to the connectors.

The physical processes involved in energy storage in an ultracapacitor are distinctly different from the electrochemical oxidation/reduction processes responsible for charge storage in batteries. Further unlike parallel plate capacitors, ultracapacitors store charge at an atomic level between electrode and electrolyte. The double layer charge storage mechanism of an ultracapacitor is highly efficient and can produce high specific capacitance, up to several hundred Farads per cubic centimeter.

A major advantage of an ultracapacitor is its ability to deliver electrical energy at high power rating. A high power operation is predicated on a low internal resistance. Hence, ultracapacitor separators are made of highly porous materials that provide minimal resistance to electrolyte ion movement and that at the same time, provide electronic insulator properties between opposing electrodes. Further, the separators must be cost effective to provide a commercial ultracapacitor.

Various materials have been used as separators in ultracapacitor, including (1) aquagel and resorcinol formaldehyde polymer, (2) polyolefin film, (3) non woven polystyrene cloth, (4) acrylic resin fibers and (5) non woven polyester film. Other materials such as porous polyvinyl chloride, porous polycarbonate membrane and fiberglass paper are suitable as separators for ultracapacitors.

Some separator materials such as polyesters, show high ionic resistance in nonaqueous electrolyte because of poor wettability by organic solvents such as propylene carbonates. On the other hand, some of the separator materials demonstrate good features as separators in nonaqueous electrolyte but are too expensive for commercialization.

The present invention relates to an ultracapacitor separator that electrically isolates opposing carbon electrodes while at the same time provides a minimum resistance to ion movement in electrolytic medium. The present invention overcomes a need to utilize multiple layers of separator material, which impart a high resistance to an ultracapacitor. The invention utilizes an amorphous fumed silica to provide physical separation of opposing electrodes. Preferably, the amorphous fumed silica coating is used as a coating between electrodes. The active coating can be applied to either one or both electrodes of an ultracapacitor.

Fumed silica as it is found commercially, is an agglomeration of small spheroids of about 12–13 nanometers in diameter. The spheroids are agglomerated in such a way that they form a backbone with branching dendritic structures. The fumed silica is hydrophilic and its dendritic structures act as a sieve to permit passage of electrolyte but prevent migration of carbon particles. The resistance of the plated fumed silica layer is very low because of its reduced thickness. Additionally, coated fumed silica facilitates ultracapacitor fabrication since a silica layer can be easily sprinkled onto electrodes.

SUMMARY OF THE INVENTION

The invention relates to an ultracapacitor and to a method of making an ultracapacitor. The ultracapacitor of the invention comprises two solid, nonporous current collectors, two porous electrodes separating the collectors, a porous separator between the electrodes and an electrolyte occupying the pores in the electrodes and separator. The porous separator comprises an amorphous fumed silica layer coated onto at least one of said electrodes.

The method of the invention comprises providing a multilayer structure comprising two solid, nonporous current collectors, two porous electrodes separating the current collectors, a porous separator between the electrodes and an electrolyte occupying the pores in the electrodes and separator. The porous separator comprises an amorphous fumed silica layer coated onto at least one of said electrodes. The multilayer structure is sealed to form the ultracapacitor.

DETAILED DESCRIPTION OF THE INVENTION

Figure 1:
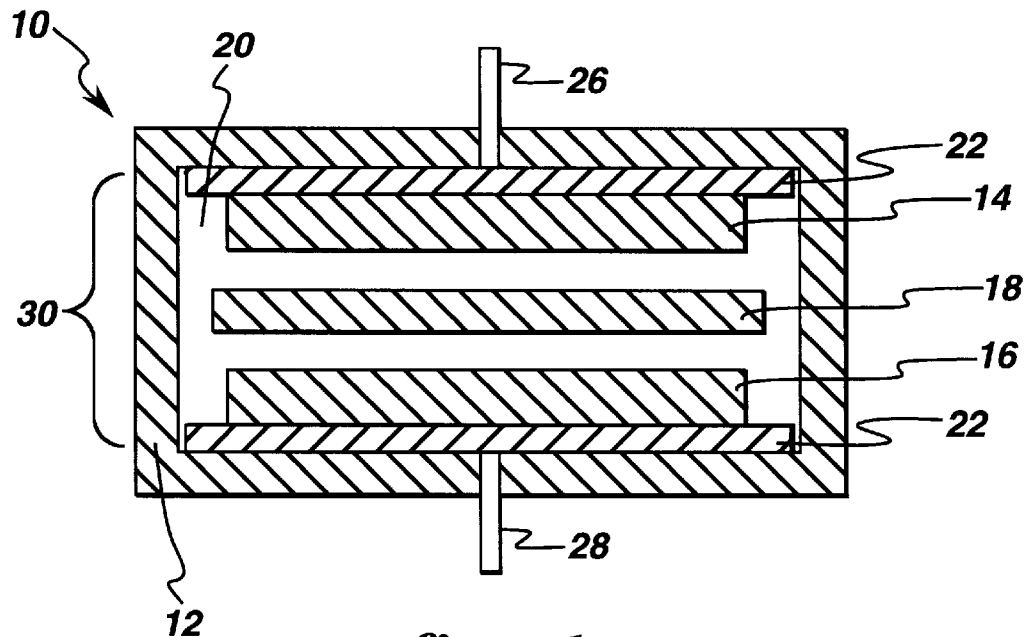
FIG. 1 is a front sectional view of a conventional ultracapacitor.
Figure 2:
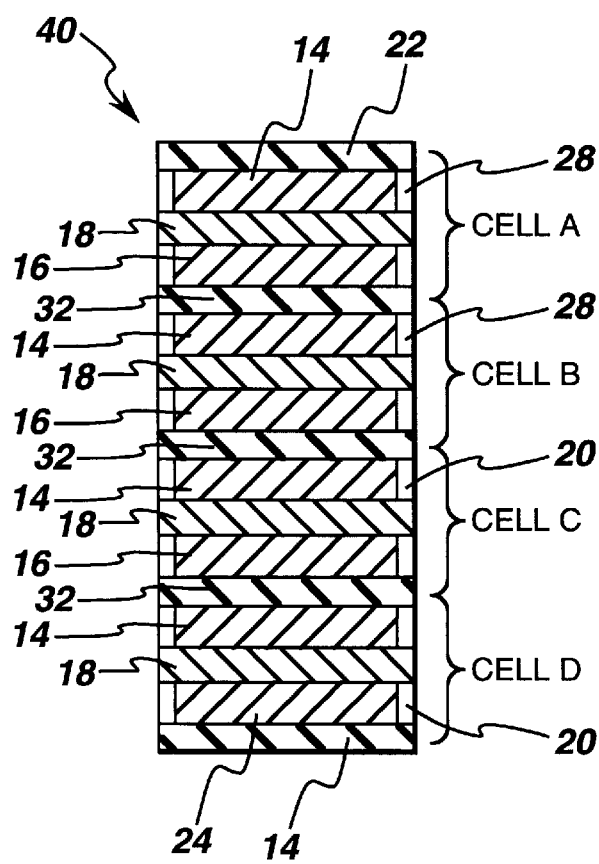
FIG. 2 is a front sectional view of a series stack of conventional ultracapacitor cells.

The separator of the invention may be used in a wide variety of ultracapacitors such as described in U.S. Pat. Nos. 5,464,453; 5,420,747; 5,150,283; 5,136,472; and 4,803,597; as well as PCT Application WO96/11486 (PCT/US95/12772; Apr. 18, 1996), all of which are incorporated herein by reference. FIGS. 1 and 2 herein, are based on PCT Application WO 96/11486 and show a non-limiting example of an ultracapacitor made by the method of the present invention.

In all of the Figures of this application, like structures are identified by the same numbers.

Referring to FIG. 1, ultracapacitor 10 includes an enclosing body 12, a pair of electrodes 14 and 16, an electronic porous separator layer 18, an electrolyte 20, a pair of conductive layers which are current collector plates 22 and 24 and electrical leads 26 and 28, extending from the current collector plates 22 and 24. One of the pair of current collector plates 22 and 24 is attached to the back of each electrode 14 and 16. Preferably, the current collector plates 22 and 24 are thin layers of aluminum foil.

The electronic porous separator layer 18 is fumed silica layer, which is intimately coated onto one of the electrodes 14, 16. Fumed silica is a silicon dioxide that is produced during burning of silicon tetrachloride in air through flame hydrolysis of the silicon tetrachloride. Molten spheres of silica are formed in the combustion process. The diameter of spheres varies with process parameters and averages about 12 to 13 nm. The molten spheres of fumed silica are sometimes referred to as primary particles. They fuse with one another to form a three dimensional branched, chain-like aggregates of approximately 0.1 to 0.5 microns in length. Cooling takes place very quickly, limiting growth and insuring that the fumed silica is amorphous. These aggregates in turn form agglomerates with a central backbone with dendritic branched structures ranging in size from 0.5 to 44 microns. Preferably fumed silica for the present invention has a particle size of up to 10 microns, more preferably between 1 and 2 microns and has a purity of 99.8% or greater $SiO_2$.

Fumed silicas useful in the present invention are commercially available and generally characterized by a chain-like particulate structure having a high surface area per unit weight. In general, the fumed silicas of the present invention will have a surface area of between 50 $m^2/g$ and 400 m2/g (as measured by the nitrogen adsorption method of F. Brunauer, P. H. Emmet and I. Teller, *J. Am. Chemical Society*, vol. 60 page 309, (1938)). Many commercially available silicas are suitable. A most preferred fumed silica is available under the name of CAB-O-SIL®. This silica has a surface area of about 200 m2/g. CAB-O-SIL® is a registered trademark of Cabot Corporation. This silica is of high quality and is readily dispersible.

The fumed silica coated activated carbon electrode of the present invention is produced by coating squares of aluminum substrates with a carbon suspension or paste by screen printing or by means of a doctor blade film applicator. Fume silica powder is then spray coated or sprinkled onto the electrodes to an even thickness of about 5 to 10 mils, which compresses to about 0.5 to 1.5 mils after assembly within an ultracapacitor. The electrodes are brought together and vacuum sealed to form an ultracapacitor. The separator 18 of the invention is placed between the opposing carbon electrodes 14 and 16. The separator 18 assures that opposing electrodes 14 and 16 are never in contact with one another. Contact between electrodes could result in a short circuit and rapid depletion of the charges stored in the electrodes. The porous nature of the separator 18 allows movement of ions in the electrolyte 20.

Again referring to FIG. 1 in a preferred embodiment, current collectors 22 and 24 are made of aluminum because of its conductivity and cost. The current collectors 22 and 24 are thin layers of aluminum foil. However, the electrodes can be any suitable conductive material.

Exemplary organic solvents for electrolyte 20 include but are not limited to nitrites such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrrolidone. Preferably, the electrolyte 20 includes a polar aprotic organic solvent such as a cyclic ester, chain carbonate, cyclic carbonate, chain ether and/or cyclic ether solvent and a salt. Preferred cyclic esters are esters having 3 to 8 carbon atoms. Examples of the cyclic esters include -butyrolactone, -butyrolactone, -valerolactone and -valerolactone. The chain carbonates are preferred to be carbonates having 3 to 8 carbon atoms. Examples of the chain carbonates include dimethyl carbonate, diethyl carbonate, dipropyl carbonate, methyl ethyl carbonate, methyl propyl carbonate and ethyl propyl carbonate. The preferred cyclic carbonates have 5 to 8 carbon atoms. Examples of the cyclic carbonates include 1,2-butylene carbonate, 2,3-butylene carbonate, 1,2-pentene carbonate, 2,3-pentene carbonate and propylene carbonate. The preferred chain ethers have 4 to 8 carbon atoms. Examples of the chain ethers include dimethoxyethane, diethoxyethane, methoxyethoxyethane, dibutoxyethane, dimethoxypropane, diethoxypropane and methoxyethoxypropnane. The preferred cyclic ethers have 3 to 8 carbon atoms. Examples of the cyclic ethers include tetrahydofuran, 2-methyl-tetrahydrofuran, 1,3-dioxolan, 1,2-dioxolan, 2-methyldioxolan and 4-methyl-dioxolan.

Suitable electrolyte salts include quaternary ammonium salts such as tetraethylammonium tetraflouroborate ($(Et)_4NBF_4$), hexasubstituted guanidinium salts such as disclosed in U.S. Pat. No. 5,726,856, the disclosure of which is incorporated herein by reference, and lithium salts such as disclosed by Ue et al., Mobility and Ionic Association of Lithium Salts in a Propylene Carbonate-Ethyl Carbonate Mixed Solvent, *Electrochem. Soc.*, vol. 142, No. 8, August 1995, the disclosure of which is incorporated herein by reference.

In a preferred embodiment, the electrodes 14, 16 in FIG. 1, are both carbon electrodes cast onto the aluminum current collectors according to the present invention.

The enclosing body 12 can be any known enclosure means commonly used with ultracapacitors. It is an advantage to minimize the weight of the packaging means to maximize the energy density of the ultracapacitor. Packaged ultracapacitors are typically expected to weigh 1.25 to 2 times more than the unpackaged ultracapacitor. The electrical leads 26 and 28 extend from the current collectors 22 and 24 through the enclosing body 12 and are adapted for connection with an electrical circuit (not shown).

Ultracapacitor 10 of FIG. 1 includes a bipolar double layer cell 30 that includes two solid, nonporous current collectors 22, 24, two porous electrodes 14, 16 separating the current collectors 22, 24 and a porous separator 18 between the electrodes 14, 16 and an electrolyte 20 occupying pores in the electrodes 14, 16 and separator 18. Individual ultracapacitor cells can be stacked in series to increase operating voltage. The optimum design is to have adjacent cells separated with only a single current collector. This collector is nonporous so that no electrolytic solution is shared between cells. This type of design is called bipolar and is illustrated in FIG. 2 of the drawings. In a bipolar double layer capacitor, one side of the current collector contacts a positive electrode and the other side contacts a negative electrode of an adjacent cell. A series stack 40 of the high performance bipolar double layer cells 30 (A, B, C and D) is illustrated in FIG. 2. In FIG. 2, each pair of polarized carbon electrodes, 14, 16 is separated with a separator 18. A current collector 32 is attached at one surface to charged electrode 14 of a first cell. Attached to an opposite surface of the current collector 32, is an oppositely charged electrode 16 of a second cell. If one side of the current collector 32 is in contact with the negative electrode for a first capacitor cell "A," then the other side of the same current collector 32 is in contact with a positive electrode for an adjacent cell "B." A sufficient amount of an electrolyte 20 is introduced such that the electrolyte 20 saturates the electrodes 14 and 16 and separator 18 within each cell. Exterior current collectors 22 and 24 are placed at each end of the stack.

The internal current collectors 32 of the series stack of cells are preferably nonporous layers of aluminum foil designed to separate the electrolyte 20 between adjacent cells. The exterior current collectors are also nonporous such that they can be used as part of the external capacitor case seal, if necessary. The electronic separator 18 is located between the opposing carbon electrodes 14 and 16 within a particular capacitor cell. The electronic separator 18 allows ionic conduction via charged ions in the electrolyte.

The ultracapacitor cell can be constructed by placing the layers of conductor, electrode and separator along with electrolyte within an enclosing body. The structure can then be subjected to pressure to seal the layers within the enclosing body. Alternatively, the enclosing body can be subjected to pressure and vacuum. The vacuum acts to remove gases while the ultracapacitor is sealed. Alternatively, the ultracapacitor cell can be constructed by providing adhesive between layers and applying pressure and or heat throughout the adhesive to seal the cell.

Figure 3:
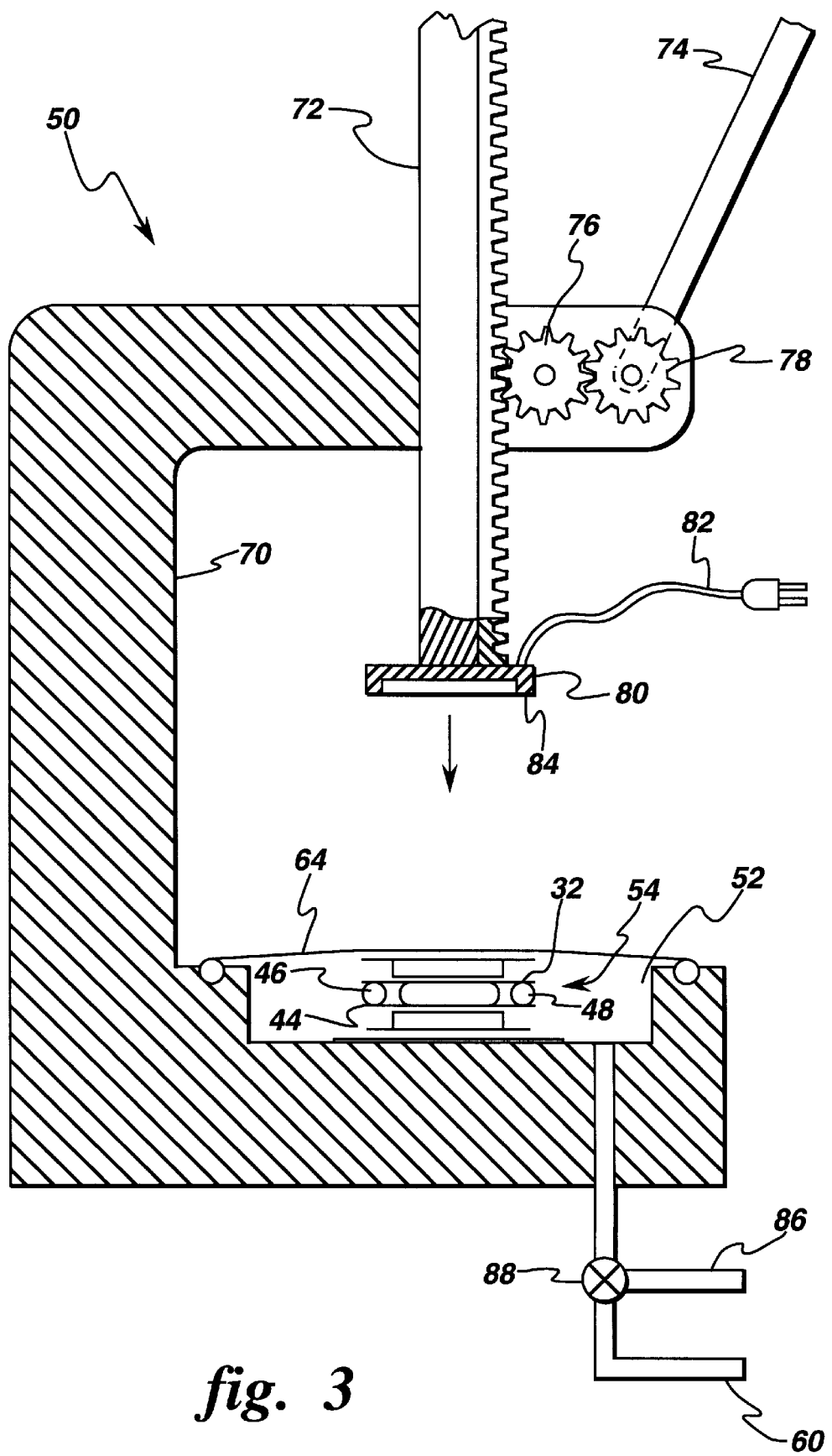
FIG. 3 is a cross-sectional view of an exemplary apparatus for sealing an ultracapacitor.

FIG. 3 depicts one, non-limiting illustration of an apparatus and method of sealing an ultracapacitor or series stack of ultracapacitor cells according to the present invention. Referring to FIG. 3, structure 50 is a frame, platform, or other construction but is often a press as described below. An enclosable region is depicted in FIG. 3 as recess 52, in which an ultracapacitor series stack 40 is disposed. The embodiment illustrated in FIG. 3 permits application of vacuum while the ultracapacitor is being sealed. Primary vacuum tube 60 communicates with recess 52. A collapsible membrane 64 can be fastened over the ultracapacitor to maintain a vacuum while the cell is being sealed by pressing.

Figure 4:
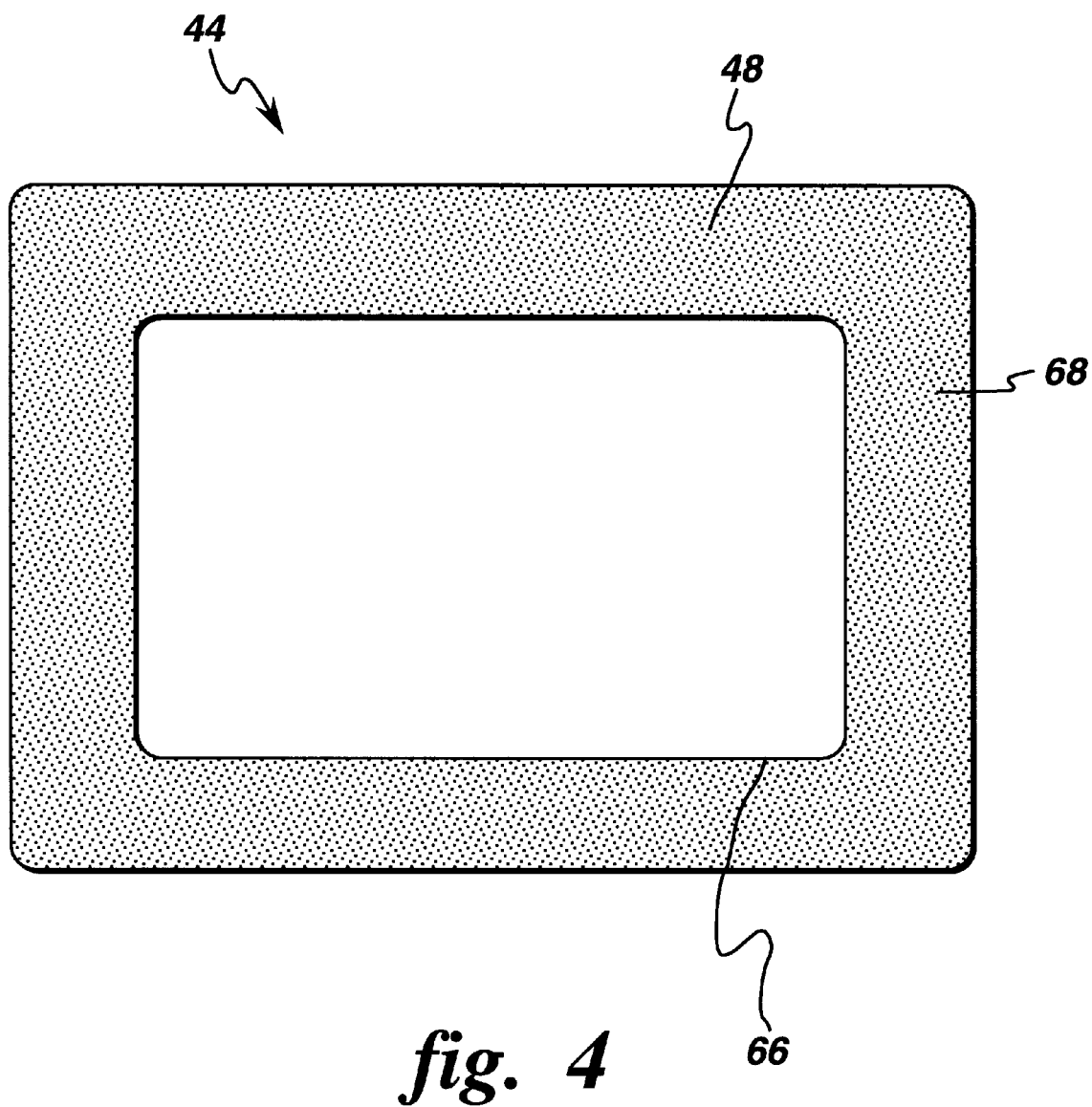
FIG. 4 is a top cross-sectional view of a separator of a sealed ultracapacitor.

FIG. 3 shows an ultracapacitor cell disposed in the recess area of the press 50. The cell includes a separator system, comprising an upper separator layer 42 and a lower separator layer 44. Sealant portions 46 and 48 are disposed in a peripheral area between the bottom surface of separator 42 and the top surface of separator 44. "Peripheral" refers to the boundary area of the separator layers. In general, this area should be as small as possible. This boundary area is designated as element 68 in FIG. 4. FIG. 4 provides a top, cross-sectional view of a separator layer similar to layer 44 of FIG. 3, after sealant has spread to some extent by the action of pressure and, optionally, heat, as described below. The boundary area 68 surrounds the primary section 66 of a separator layer.

Many different types of sealants can be used in the present invention and the term is meant to encompass, "glues", or "pastes." Sealants are described, for example, in the *Kirk-Othmer Encyclopedia of Chemical Technology*, 3rd Edition, Vol.1, pp.488–508 (1978), and in *The Condensed Chemical Dictionary*, 10th Edition, 1981, Van Nostrand Reinhold Company. In general, the selected sealant should be chemically resistant to electrolyte. It should also be capable of withstanding operating temperatures of the ultracapacitor without substantial degradation. Moreover in those embodiments where the sealant contacts the separators, it should be capable of flowing through the thickness of the separator layers. Once cured, the sealant should be substantially impermeable to the flow or passage of electrolyte.

Heat-curable sealants may be used in some embodiments. Moisture-cured sealants or externally-cured materials may be used. Other embodiments may use air-curable or pressure-sensitive sealants, such as "hot melt" glues. Illustrative sealants include those based on acrylic, ethylene such as ethylene vinyl acetate (EVA) copolymer, silicone, rubber, epoxy materials, or combinations of these materials. Commercial examples include the materials commonly referred to as "hot glues."

The sealants are usually in the form of liquids, pastes, or solids. A sealant may be applied to one or both of the facing surfaces of the separators or other surfaces. Many techniques are available for applying sealant. Known application techniques include the use of a spatula, brush, roller, spray, or glue gun. As one example, a bead, strip or "ring" of sealant is applied along the peripheral area 68 of one of the separator layers. Alternatively, individual droplets of sealant can be deposited at sites in the peripheral area 68 with the droplets flowing and covering the peripheral area 68 upon the application of pressure, vacuum and/or heat. As yet another alternative, at least one of the separator layers 18 can be pre-impregnated with sealant. All of these techniques cause the sealant to form a continuous layer. In general, the particular method of deposition is not critical, as long as the sealant is applied to locations where it will eventually form a seal after pressure or vacuum is released. The ultracapacitor becomes sealed by a barrier which is perpendicular to the horizontal capacitor layers which are encased in the barrier.

A compressive force is applied to promote the flow of the sealant—especially in the case of sealant compositions with very high softening points or glass transition temperatures, such as the EVA based types. Compression can be applied indirectly to the sealant through upper ultracapacitor layers by means of the mechanical press 50 of FIG. 3. Other devices to seal an ultracapacitor include an hydraulic press or pneumatic press or any device for applying compressive force. The press 50 of FIG. 3 includes structural frame 70 and adjustable beam 72. The length of beam 72 moves in a direction perpendicular to the base portion of the structural frame as controlled by the selective action of hand lever 74 and gears 76 and 78. Compression element 80 is detachably attached as the base of beam 72. Bottom surface 82 can be similar in shape to the peripheral area of the top planar surface of ultracapacitor 40. The force applied by the press should be sufficient to cause the sealant to become substantially fluid, to flow and form a continuous bead or strip around the peripheral area of the layer on which it is deposited. Thus, the particular press force depends in large part on the nature of the sealant. In general, the pressure will be in the range of about 1 psi to about 1,000 psi and preferably, in the range of about 10 psi to about 100 psi. A lower press force will be suitable for lower viscosity sealants and a higher press force will be required for higher viscosity materials.

The sealant can be heated while being compressed. Heating enhances the flow characteristics of the sealant. Heating temperature should be sufficient to soften the sealant. Preferably, the temperature is high enough to melt the sealant. For a sealant made from an EVA based material, a suitable temperature will be in the range of about 100° C. to about 300° C.

Heat is applied to the sealant in the press 50 of FIG. 3 by means of a standard electrical heating element that is encased within element 80 and is connected to an electrical outlet by way of cord 82. The bottom surface 84 of element 80 has a shape that aligns with sealant-containing peripheral regions of ultracapacitor 10. Thus, when compression element 80 is lowered for compression of the ultracapacitor through membrane 64, heat is transmitted primarily to the sealant containing regions.

A vacuum can be applied to press together the layers of the ultracapacitor and to evacuate ambient gasses from the internal region of the cell structure. In FIG. 3, vacuum tube 60 is connected to a vacuum source through vacuum valve 88 with backfill vacuum tube 86. When vacuum is applied, the collapsible membrane 64 is positioned over recess 52. The membrane 64 maintains the vacuum within the recess and transmits the applied compressive force to the layers of the ultracapacitor. The membrane 64 is heat-resistant to a temperature of about 400° C. The amount of vacuum applied ranges from about 700 mm mercury to 0.1 mm mercury. A typical vacuum pressure is in the range of about 500 mm mercury to about 0.1 mm mercury.

In operation, the applied vacuum pressure draws collapsible membrane 64 tightly against the top of ultracapacitor 10, compressing the individual layers of the ultracapacitor against platform layer 58 while the action of compression element 80 presses against sealant-containing regions to induce sealant 46, 48 to permeate the peripheral regions of separator layers 18. The sealant contacts substantially aligned peripheral areas 60 of the facing surfaces of conductive layers 22 and 24. As the sealant cures or solidifies, it forms a strong bond to join layers 22 and 24. After sealing is complete, compression element 80 is retracted and the ultracapacitor is allowed to cool.

The following examples are illustrative of the invention.

EXAMPLES

Ultracapacitors were constructed comprising two aluminum plates between which were two carbon electrodes separated by a layer of fume silica. The carbon electrodes were made by forming a paste of carbon in 1 M tetraethylammonium tetraflouroborate ($(Et)_4NBF_4$)/propylene carbonate electrolyte and casting the paste by means of a Gardner knife applicator onto a 2"×2"×0.02" aluminum current collector to a thickness of 9 mils. A layer of fume silica was sprinkled onto the surface of each electrode to a controlled thickness of 2 mils. The fume silica layer was imbibed with 1 M tetraethylammonium tetraflouroborate electrolyte. The carbon electrodes were pressed together in pairs with intervening fume silica layers to form ultracapacitor cells. The cells were sealed with SEARS HOT GLUE, an ethylene/vinyl acetate copolymer thermoplastic sealant, applied while subjecting the cells to vacuum.

Figure 5:
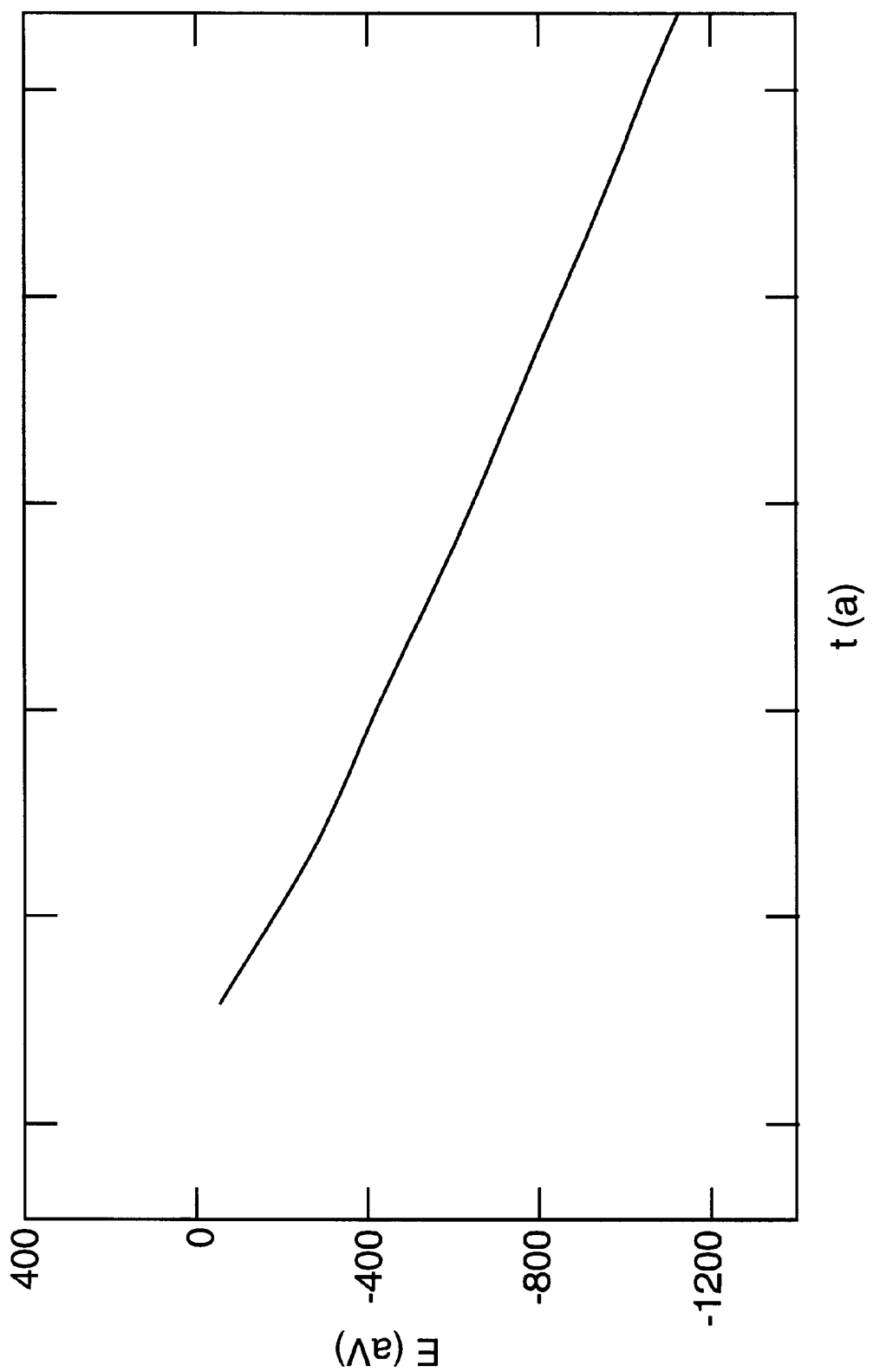
FIG. 5 is a discharge curve for an ultracapacitor.

Constant current charge was employed to characterize cell performance. In these examples, a cell was charged at 100 mA and cell voltage was recorded as a function of time. The resulting discharge curve is shown in FIG. 5. An internal resistance of 0.44 ohm was extracted rom the curve for a fume silica-based cell with a geometric electrode area of 25.9 $cm^2$. This value was less than the same size ultracapacitors with conventional polyester separators.

Additionally, cyclic voltammetry charge was employed to characterize cell performance. In these examples, the two end electrodes of each cell were connected to a potentiostat (EG&G 273A, EG&G Instruments, NJ). The potentiostat was used to control voltage applied to the stack and to measure current flow through the ultracapacitor as the voltage changed as a function of time at a fixed rate. Voltage scan rate was 2 mV/second. The resulting voltammograms showed no significant current leakage indicating that fume silica separators provide adequate electrical insulation between carbon electrodes.

These examples demonstrate that devices can be produced with fume silica coating separators that have less internal resistance compared to ultracapacitors using cellulosic separators.

What is claimed is:

1. An ultracapacitor comprising at least one cell, said cell comprising:
    two solid, nonporous current collectors, two porous electrodes separating said current collectors, a porous separator between said electrodes and an electrolyte occupying pores in said electrodes and separator, wherein said porous separator comprises an amorphous fumed silica layer coated onto at least one of said electrodes.

2. The ultracapacitor of claim 1, wherein said current collectors comprise an aluminum substrate.

3. The ultracapacitor of claim 1, wherein said electrodes comprise carbon.

4. The ultracapacitor of claim 1, wherein said electrolyte comprises a polar aprotic organic solvent and a quaternary ammonium salt, a hexasubstituted quanidium salt or a lithium salt.

5. The ultracapacitor of claim 1, comprising a plurality of electrodes separating said current collectors.

6. A stack of ultracapacitor cells, comprising said at least one cell of claim 1.

7. A stack of ultracapacitor cells, comprising said at least one cell of claim 2.

8. A stack of ultracapacitor cells, comprising at least one of the cells of claim 3.

9. A stack of ultracapacitor cells, comprising said at least one cells of claim 4.

10. A stack of ultracapacitor cells, comprising said at least one cell of claim 5.

11. A method of making an ultracapacitor, comprising:
    (A) providing a multilayer cell comprising two solid, nonporous current collectors; two porous electrodes separating said current collectors; a porous separator between said electrodes and an electrolyte occupying pores in said electrodes and separator, wherein said porous separator layer comprises an amorphous fumed silica layer coated onto at least one of said electrodes; and (B) sealing said cell to form said ultracapacitor.

12. A method of making a stack of ultracapacitor cells, comprising:

(A) providing in stacked relationship, a plurality of bipolar double layer ultracapacitor cells, at least one of said cells comprising porous, oppositely charged electrodes with ionically charged separator disposed between said electrodes, wherein said separator comprises an amorphous fumed silica layer coated onto at least one of said electrodes;

(B) providing a nonporous current collector between each cell with each current collector having adjoining polarized electrodes of different cells bonded thereto;

(C) saturating said electrodes and separator with electrolyte; and (D) sealing said cells, current collectors and separator to form said stack of ultracapacitor cells.

* * * * *